US012345408B1

(12) United States Patent
Cheng

(10) Patent No.: US 12,345,408 B1
(45) Date of Patent: Jul. 1, 2025

(54) LIGHT SOURCE MODULE

(71) Applicant: HIMAX TECHNOLOGIES LIMITED, Tainan (TW)

(72) Inventor: Yu-Ching Cheng, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/671,973

(22) Filed: May 22, 2024

(51) Int. Cl.
*F21V 5/00* (2018.01)
*F21Y 113/00* (2016.01)
*F21Y 115/30* (2016.01)

(52) U.S. Cl.
CPC ........... *F21V 5/007* (2013.01); *F21Y 2113/00* (2013.01); *F21Y 2115/30* (2016.08)

(58) Field of Classification Search
CPC ...... F21V 5/007; F21V 7/0091; F21V 7/0083; F21V 5/005; F21Y 2115/30; F21Y 2113/00; G02B 6/0036; G02B 6/0058; G02B 3/0056
See application file for complete search history.

(56) References Cited

U.S. PATENT DOCUMENTS

| | | | | |
|---|---|---|---|---|
| 6,456,437 | B1 * | 9/2002 | Lea | F21V 5/02 359/627 |
| 2007/0091444 | A1 * | 4/2007 | Kim | G02B 17/0856 359/626 |
| 2021/0018159 | A1 * | 1/2021 | Vredenborg | F21V 5/005 |

* cited by examiner

*Primary Examiner* — Erin Kryukova
(74) *Attorney, Agent, or Firm* — JCIPRNET

(57) ABSTRACT

A light source module having a wide field of view (FOV) is provided. The light source module includes a plurality of point light sources and a total internal reflection (TIR) lens array. The point light sources are configured to respectively emit a plurality of light beams. The TIR lens array is disposed on paths of the light beams and includes a transparent substrate and a plurality of TIR lenses arranged on the transparent substrate. The transparent substrate is located between the point light sources and the TIR lenses. Each of the TIR lenses has an inclined surface inclined with respect to the transparent substrate, and inclined surfaces of the TIR lenses are configured to totally internally reflect the light beams to form the wide FOV.

12 Claims, 10 Drawing Sheets

LIGHT SOURCE MODULE

BACKGROUND

Technical Field

The invention relates to a light source module.

Description of Related Art

Diffuser devices for light shaping or light scattering control are increasingly being used in a variety of three-dimensional (3D) sensing applications. In some applications, such as automotive or robotic sensing, devices that project light scattering with a wide field of view (FOV) are needed.

One of the most common diffuser devices uses a refractive micro-lens array (MLA). By designing the lens profiles of the MLA, one can shape the input light source to the desired intensity distribution.

However, from Snell's law, there's a limitation of the projected FOV using the refractive MLA, and when the projected FOV gets increased, the lens profiles would become very steep and become difficult for fabrication.

SUMMARY

Accordingly, the invention is directed to a light source module, which can achieve a wide FOV and is easy for fabrication.

An embodiment of the invention provides a light source module having a wide FOV. The light source module includes a plurality of point light sources and a total internal reflection (TIR) lens array. The point light sources are configured to respectively emit a plurality of light beams. The TIR lens array is disposed on paths of the light beams and includes a transparent substrate and a plurality of TIR lenses arranged on the transparent substrate. The transparent substrate is located between the point light sources and the TIR lenses. Each of the TIR lenses has an inclined surface inclined with respect to the transparent substrate, and inclined surfaces of the TIR lenses are configured to totally internally reflect the light beams to form the wide FOV.

In the light source module according to the embodiment of the invention, TIR lenses are adopted, each of the TIR lenses has an inclined surface inclined with respect to the transparent substrate, and inclined surfaces of the TIR lenses are configured to totally internally reflect the light beams to form the wide FOV. As a result, the light source module according to the embodiment of the invention can achieve a wide FOV view and is easy for fabrication.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
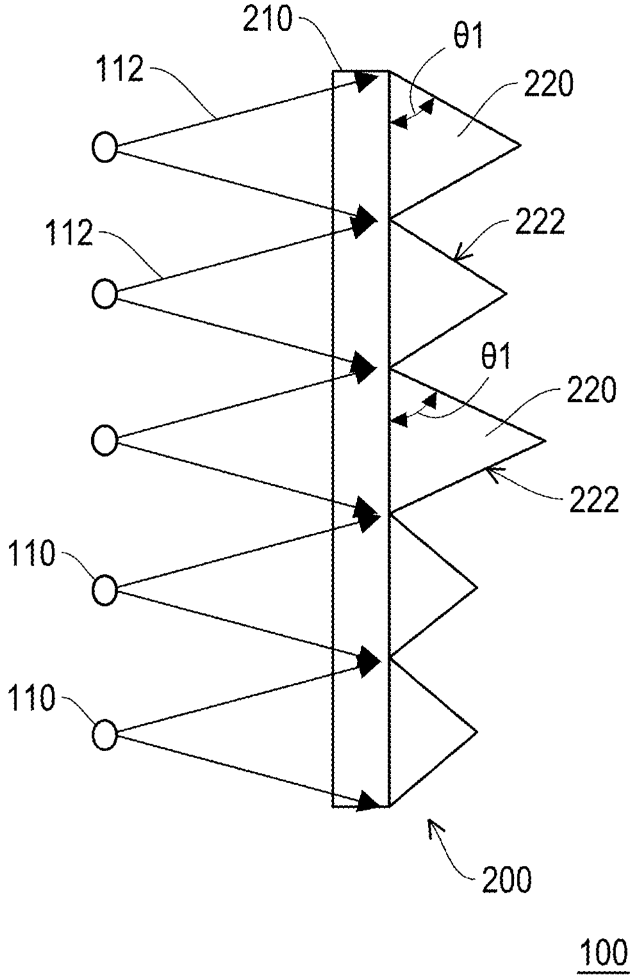
FIG. 1 is a schematic cross-sectional view of a light source module according to an embodiment of the invention.
Figure 2:
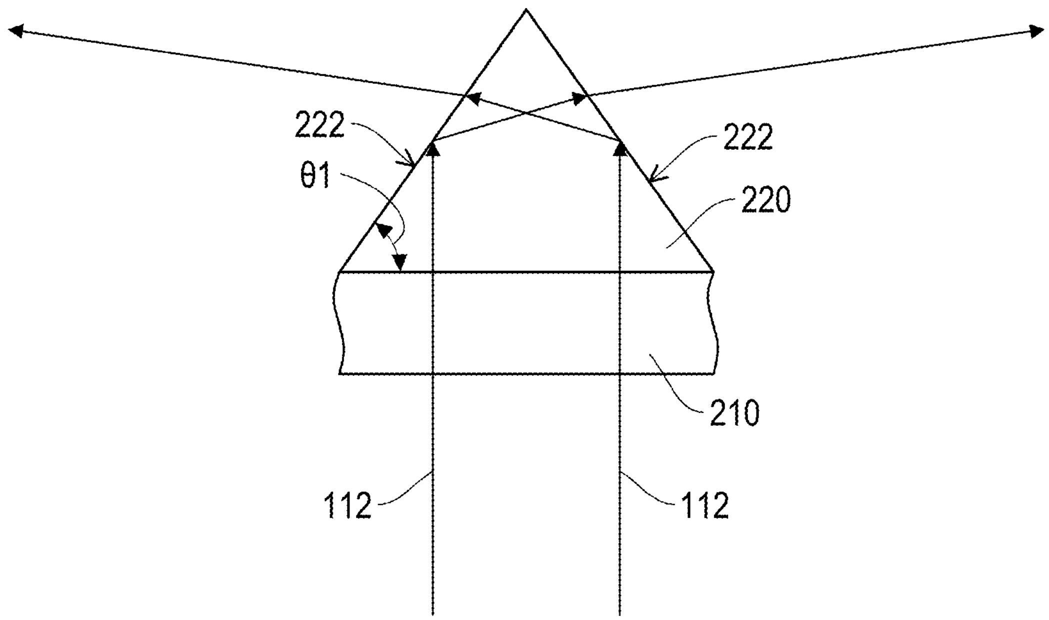
FIG. 2 shows the inclined surface of a TIR lens in FIG. 1 reflecting a light beam emitted from a collimated light source.
Figure 3A:
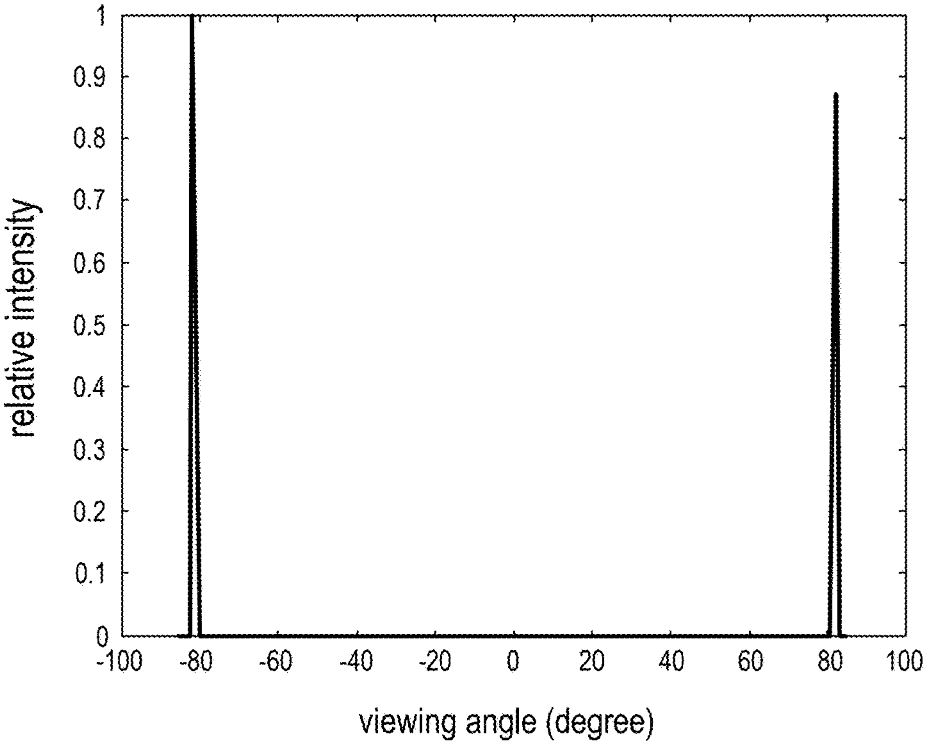
FIG. 3A shows a relative intensity distribution with respect to viewing angles formed by the light beam leaving the TIR lens in FIG. 2 when the inclined surface of the TIR lens has an inclined angle of 54.46 degrees.
Figure 3B:
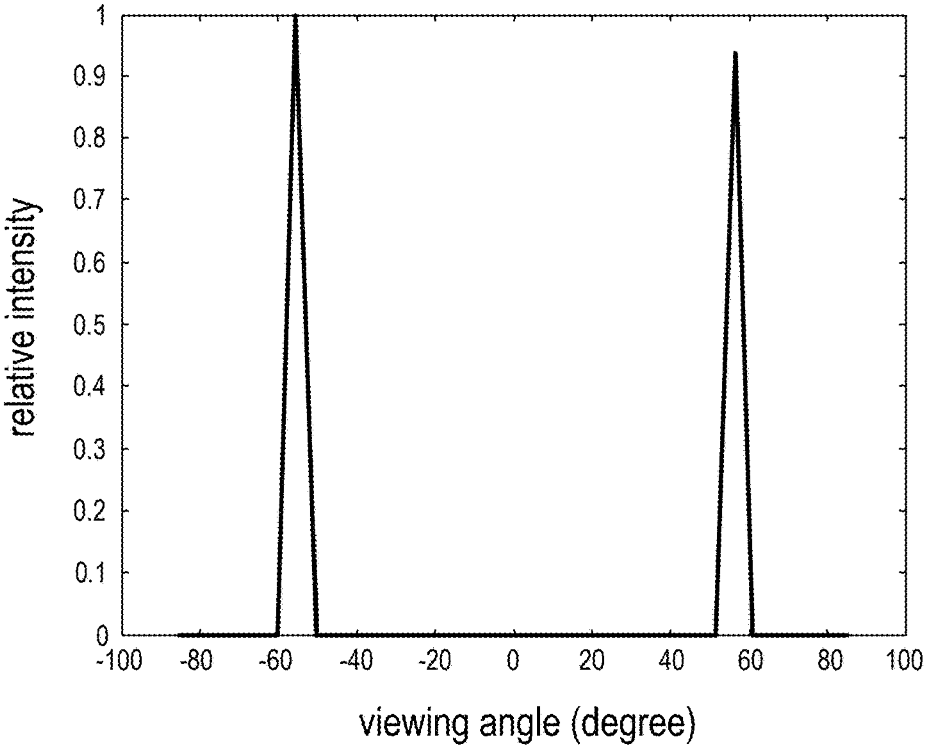
FIG. 3B shows a relative intensity distribution with respect to viewing angles formed by the light beam leaving the TIR lens in FIG. 2 when the inclined surface of the TIR lens has an inclined angle of 60.95 degrees.

FIG. 1 is a schematic cross-sectional view of a light source module according to an embodiment of the invention, and FIG. 2 shows the inclined surface of a TIR lens in FIG. 1 reflecting a light beam emitted from a collimated light source. FIG. 3A shows a relative intensity distribution with respect to viewing angles formed by the light beam leaving the TIR lens in FIG. 2 when the inclined surface of the TIR lens has an inclined angle of 54.46 degrees, and FIG. 3B shows a relative intensity distribution with respect to viewing angles formed by the light beam leaving the TIR lens in FIG. 2 when the inclined surface of the TIR lens has an inclined angle of 60.95 degrees. Referring to FIG. 1, FIG. 2, FIG. 3A, and FIG. 3B, the light source module 100 in this embodiment has a wide FOV. The light source module 100 in this embodiment includes a plurality of point light sources 110 and a total internal reflection (TIR) lens array 200. The point light sources 110 are configured to respectively emit a plurality of light beams 112. In this embodiment, the point light sources 110 are a vertical cavity surface emitting laser (VCSEL) or a VCSEL array. However, in other embodiments, the point light sources 110 may be a photonic crystal surface emitting laser (PCSEL), a PCSEL array, micro-light-emitting diodes (micro-LEDs), or a micro-LED array.

The TIR lens array 200 is disposed on paths of the light beams 112 and includes a transparent substrate 210 and a plurality of TIR lenses 220 arranged on the transparent substrate 210. The TIR lens array 200 may be in a regular arrangement or in a random arrangement. The transparent substrate 210 is located between the point light sources 110 and the TIR lenses 220. Each of the TIR lenses 220 has an inclined surface 222 inclined with respect to the transparent substrate 210, and inclined surfaces 222 of the TIR lenses 220 are configured to totally internally reflect the light beams 112 to form the wide FOV. In this embodiment, each of the TIR lenses 220 is a TIR cone, and each of the inclined surfaces 222 is a conical surface, for example. The light beam 112 from a point light source 110 passes through the transparent substrate 210, is totally internally reflected by the inclined surface 222 on a side, and passes through the inclined surface 222 on another opposite side in sequence, so as to form a wide FOV. In an embodiment, the light source module 100 may be a flood light illuminator of a time-of-flight (ToF) sensor for three-dimensional sensing. However, in other embodiments, the light source module 100 may be a light emitter of any other type and for any other application.

In FIG. 2, the inclined surface 222 of the TIR lens 220 has an inclined angle θ1 with respect to the transparent substrate 210, FIG. 3A shows a relative intensity distribution with respect to viewing angles formed by the light beam 112 leaving the TIR lens 220 in FIG. 2 when the inclined surface 222 of the TIR lens 220 has an inclined angle θ1 of 54.46 degrees, and FIG. 3B shows a relative intensity distribution with respect to viewing angles formed by the light beam 112 leaving the TIR lens 220 in FIG. 2 when the inclined surface 222 of the TIR lens 220 has an inclined angle θ1 of 60.95 degrees. It can be learned from FIG. 3A and FIG. 3B that the smaller the inclined angle θ1 is, the larger the FOV can be. Therefore, for achieving a large FOV, the inclined surface 222 need not be steep but is gentle, so that the TIR lens 220 is easy to fabricate for achieving a large FOV.

In this embodiment, the TIR lenses 220 have a plurality of different inclined angles θ1 of the inclined surface 222 with respect to the transparent substrate 210. Since different inclined angles θ1 contribute intensities at different viewing angles, as shown in FIG. 3A and FIG. 3B for example, with well design of the different inclined angles θ1, the light source module 100 can provide uniform illumination at viewing angles from 0 degree to the largest viewing angle within the FOV.

Figure 4:
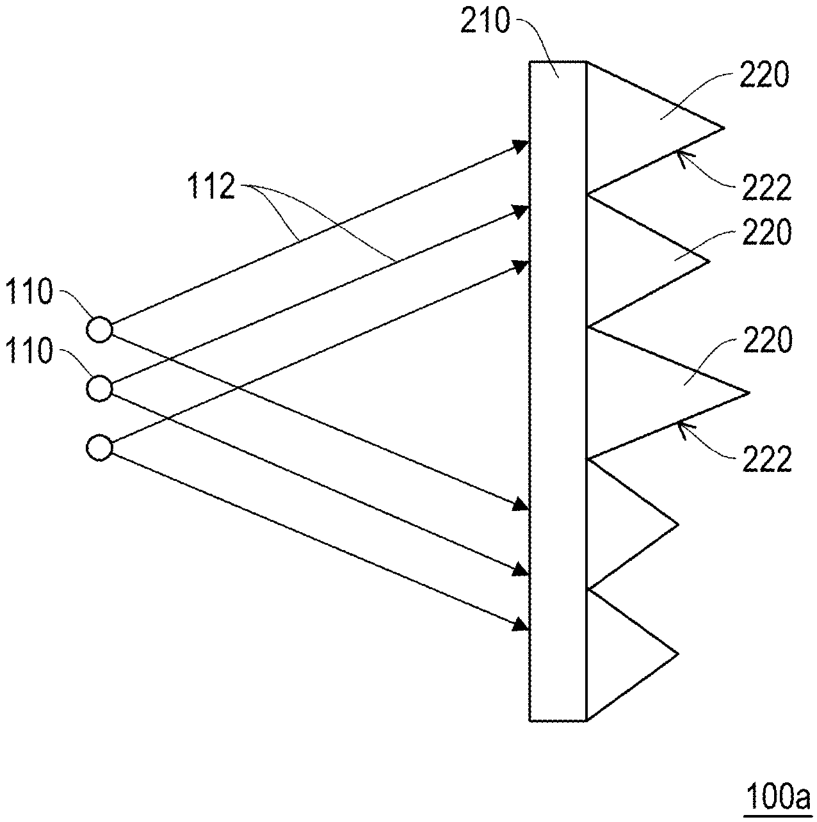
FIG. 4 is a schematic cross-sectional view of a light source module according to another embodiment of the invention.

In this embodiment, a light beam 112 from each of the point light sources 110 is reflected by the inclined surface 222 of one of the TIR lenses 220. However, in the light source module 100*a* in the embodiment of FIG. 4, a light beam 112 from each of the point light sources 110 is reflected by inclined surfaces 222 of several of the TIR lenses 220.

Figure 5A:
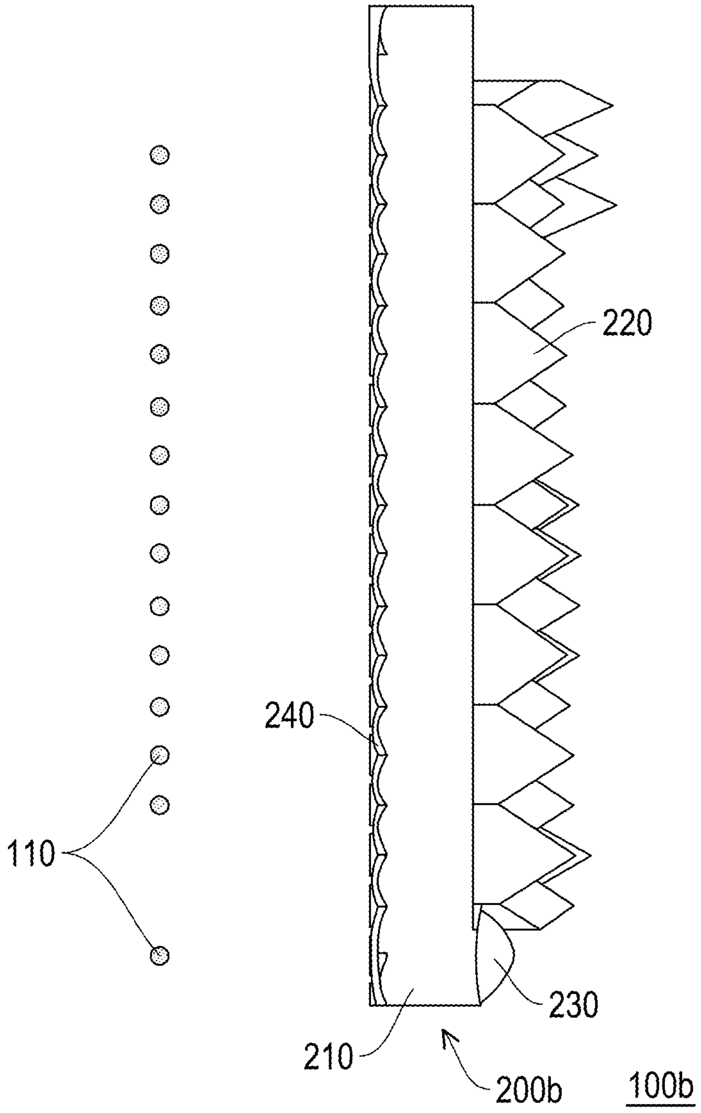
FIG. 5A is a schematic cross-sectional view of a light source module according to another embodiment of the invention.
Figure 5B:
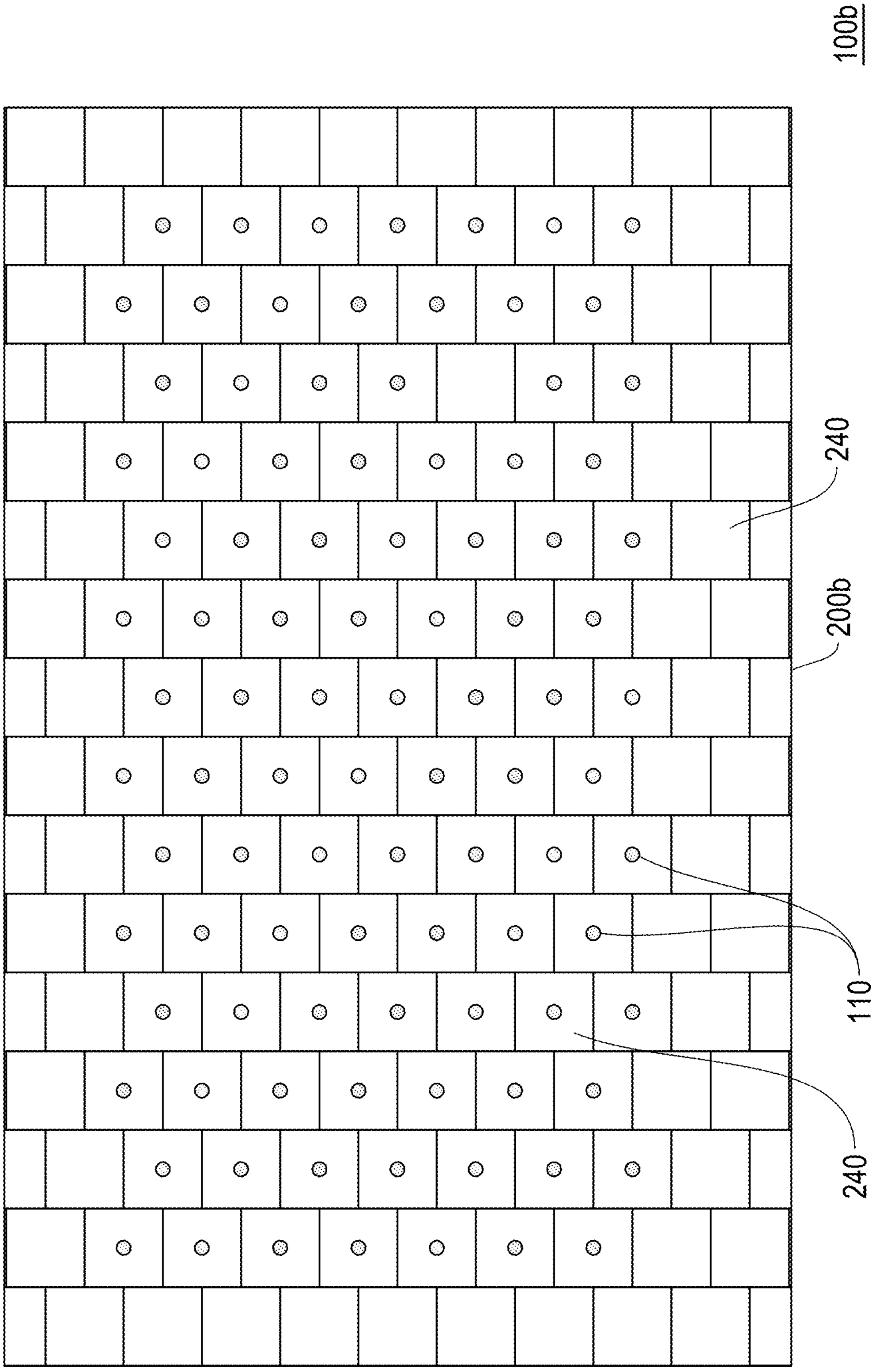
FIG. 5B is a front view of the light source module in FIG. 5A.
Figure 5C:
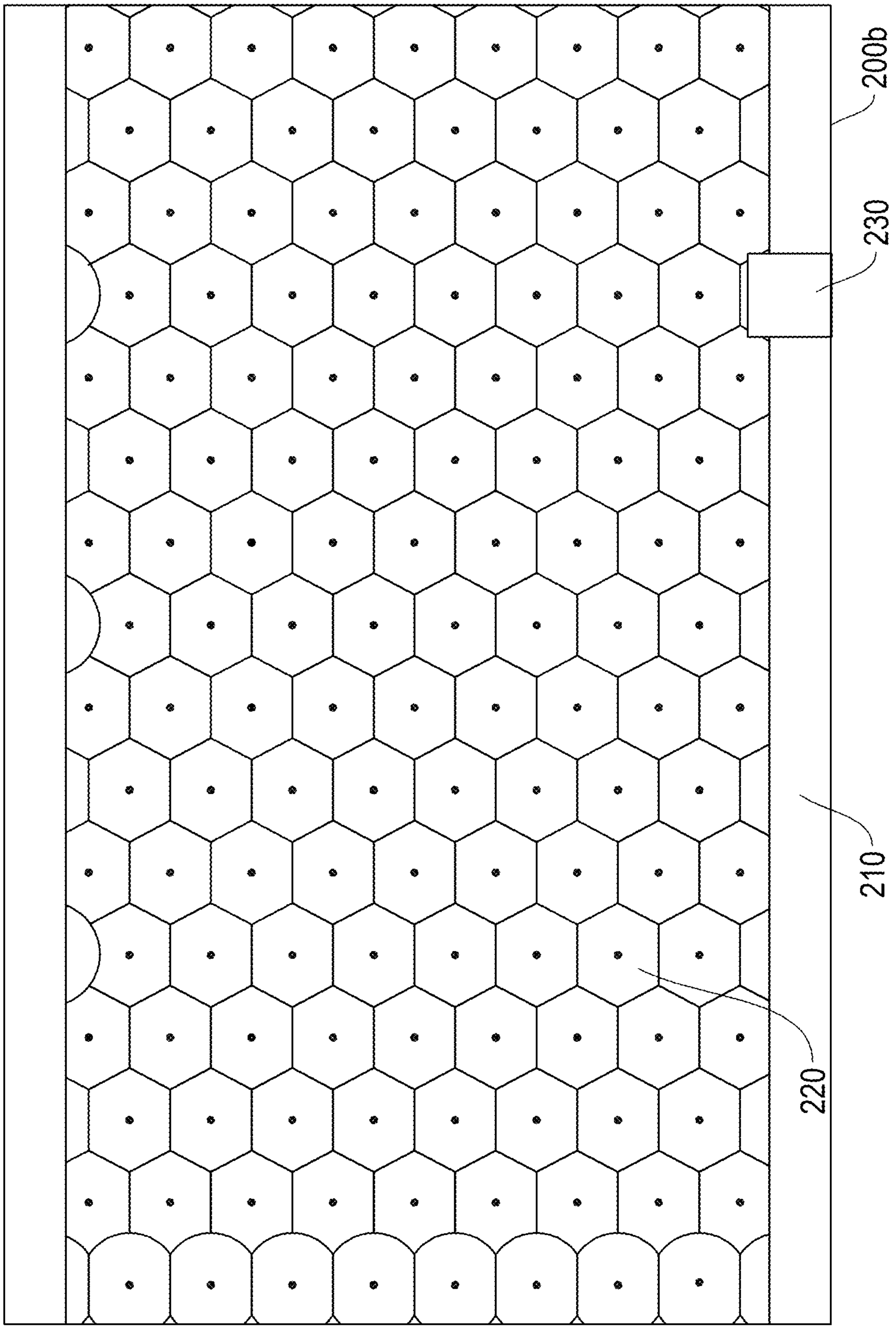
FIG. 5C is a back view of the light source module in FIG. 5A.
Figure 6:
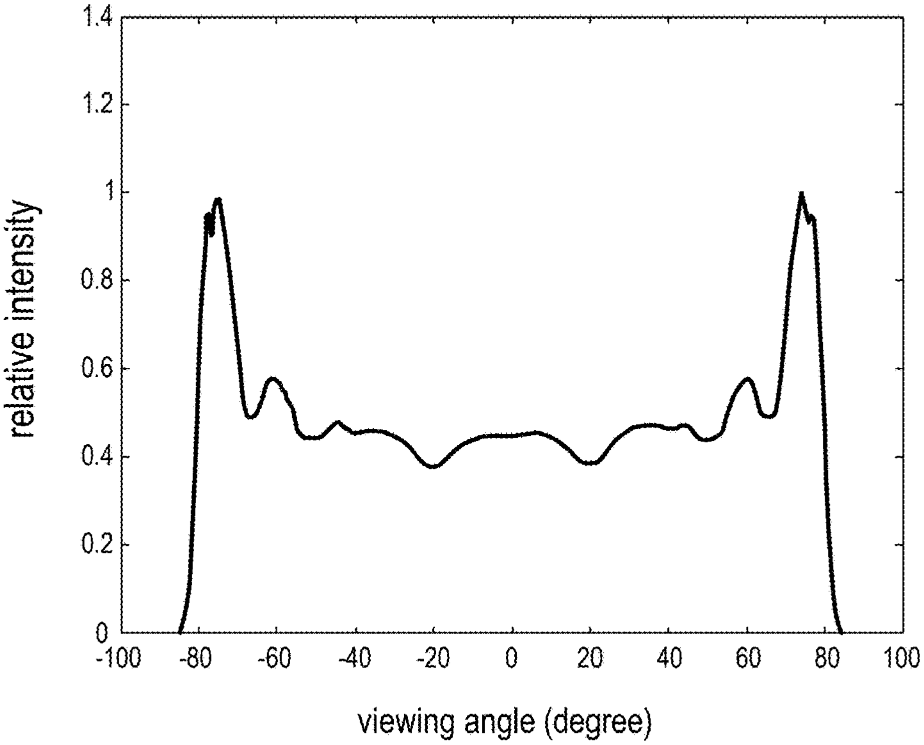
FIG. 6 shows a relative intensity distribution with respect to viewing angles formed by the light beam leaving the TIR lens array in FIG. 5A according to an embodiment of the invention.
Figure 7:
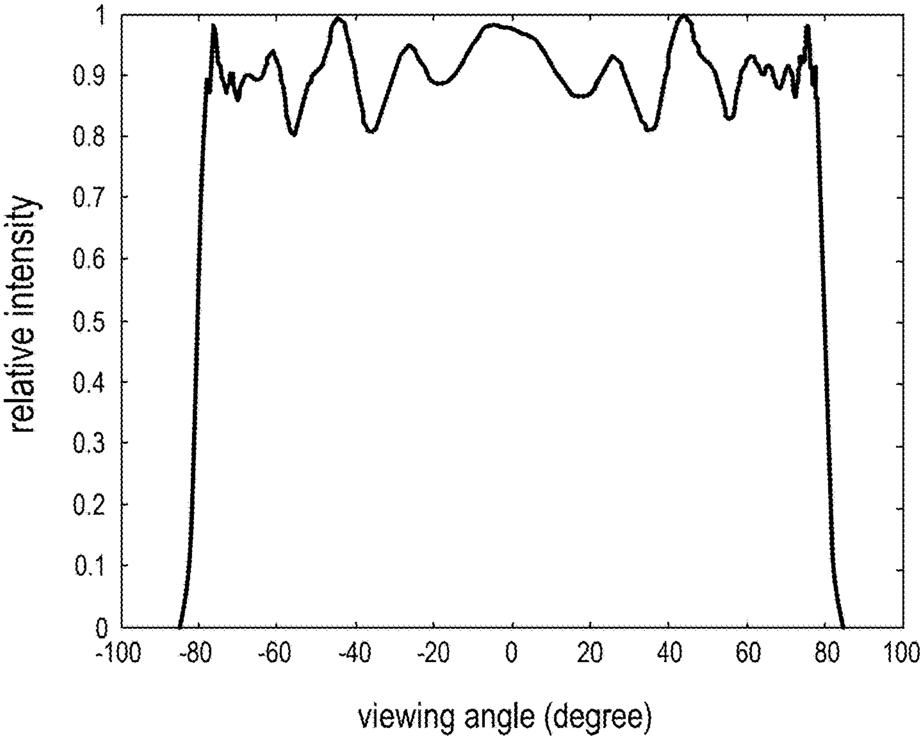
FIG. 7 shows a relative intensity distribution with respect to viewing angles formed by the light beam leaving the TIR lens array in FIG. 5A according to another embodiment of the invention.

FIG. 5A is a schematic cross-sectional view of a light source module according to another embodiment of the invention, FIG. 5B is a front view of the light source module in FIG. 5A, and FIG. 5C is a back view of the light source module in FIG. 5A. Referring to FIG. 5A, FIG. 5B, and FIG. 5C, the light source module 100*b* in this embodiment is similar to the light source module 100 in FIG. 1, and the main differences therebetween are as follows. In the light source module 100*b*, the TIR lens array 200*b* further includes a plurality of refractive lenses 230 arranged on the transparent substrate 210, and the transparent substrate 210 is located between the point light sources 110 and the refractive lenses 230. In an embodiment, the refractive lenses 230 may be arranged in an array on the transparent substrate 210. The refractive lenses 230 may refract the light beam 112 and contribute light intensities at viewing angles less than the largest viewing angle within the FOV as shown in FIG. 6. Moreover, by adopting TIR lenses having a plurality of different inclined angles θ1 and the refractive lenses 230, the light source module 100*b* can provide uniform illumination at viewing angles from 0 degree to the largest viewing angle within the FOV, as shown in FIG. 7. In another embodiment, the refractive lenses 230 may be located between the point light sources 110 and the transparent substrate 210.

In this embodiment, the TIR lens array 200*b* further includes a plurality of collimating lenses 240 arranged on the transparent substrate 210, and the collimating lenses 240 are located between the point light sources 110 and the transparent substrate 210. The collimating lenses 240 are configured to collimate the light beams 112 from the point light sources 110.

Figure 8A:
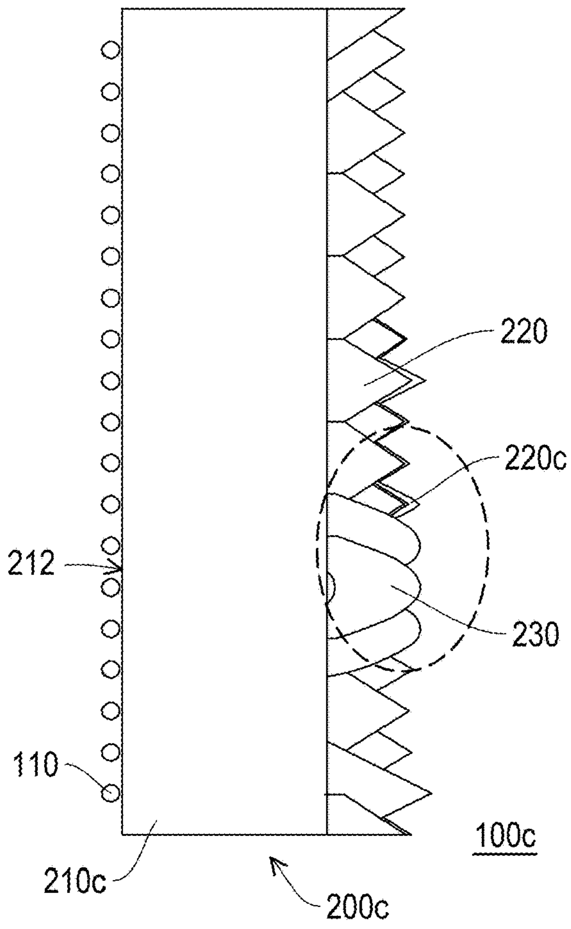
FIG. 8A is a schematic cross-sectional view of a light source module according to another embodiment of the invention.
Figure 8B:
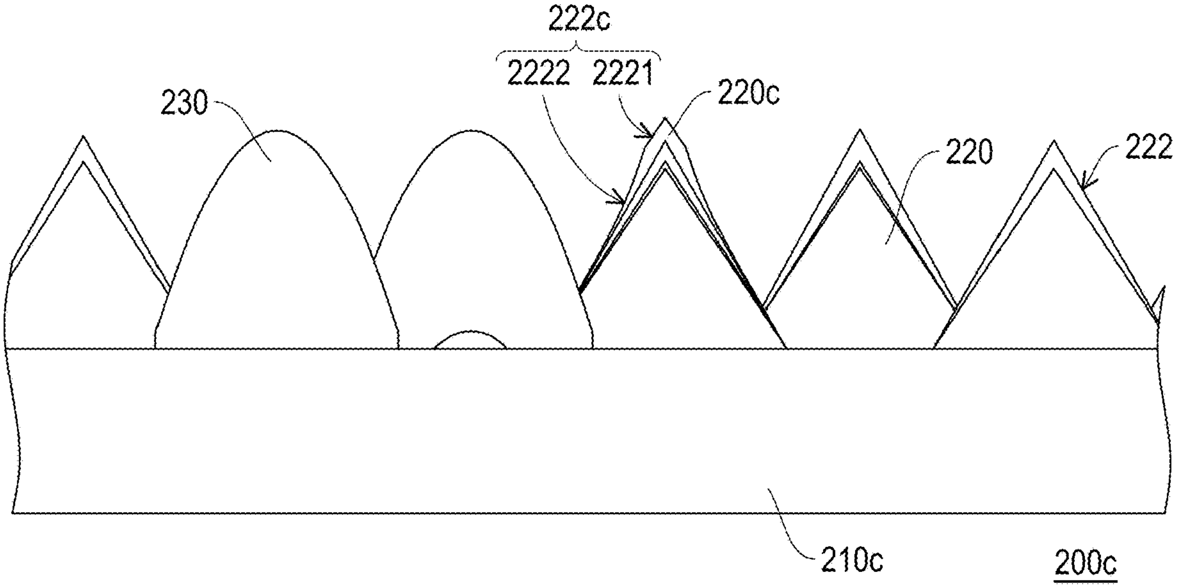
FIG. 8B is a local enlarged view of FIG. 8A.

FIG. 8A is a schematic cross-sectional view of a light source module according to another embodiment of the invention, and FIG. 8B is a local enlarged view of FIG. 8A. Referring to FIG. 8A and FIG. 8B, the light source module 100*c* in this embodiment is similar to the light source module 100 in FIG. 1, and the main differences therebetween are as follows. In the light source module 100*c*, the transparent substrate 210*c* is a substrate of a bottom emitting vertical cavity surface emitting laser (VCSEL), and the point light sources 110 belong to the bottom emitting VCSEL, and the point light sources 110 are located on the back surface 212 of the transparent substrate 210*c*. The TIR lens array 200*c* in this embodiment further includes a plurality of refractive lenses 230 arranged on the transparent substrate 210*c*, and the transparent substrate 210*c* is located between the point light sources 110 and the refractive lenses 230.

Moreover, in this embodiment, the inclined surface 222*c* of each of at least parts of the TIR lenses 220*c* has a plurality of different slopes with respect to the transparent substrate 210*c*. For example, the inclined surface 222*c* of the TIR lens 220*c* has two inclined sub-surfaces 2221 and 2222, and the slope of the sub-surface 2221 with respect to the transparent substrate 210*c* is different from the slope of the sub-surface 2222 with respect to the transparent substrate 210*c*. That is to say, inclined surfaces 222*c* of at least parts of the TIR lenses 220*c* are freeform surfaces. By adopting the inclined surface 222*c* with a plurality of different slopes, the inclined surface 222*c* may contribute intensities at different viewing angles.

Figure 9:
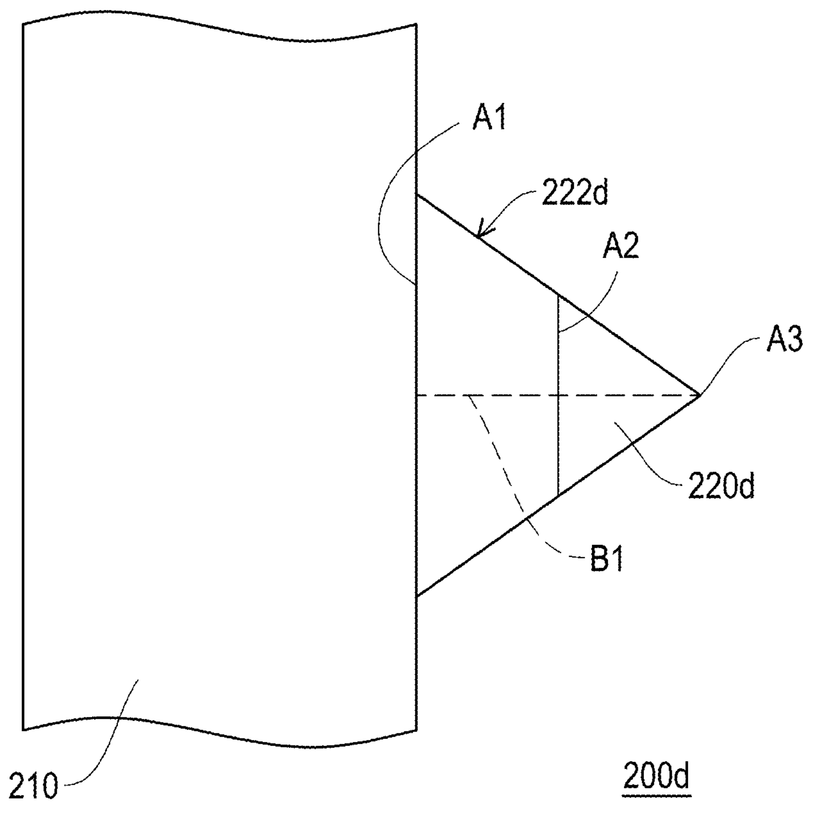
FIG. 9 is a schematic partial cross-sectional view of a TIR lens array according to another embodiment of the invention.

FIG. 9 is a schematic partial cross-sectional view of a TIR lens array according to another embodiment of the invention. Referring to FIG. 9, the TIR lens array 200*d* in this embodiment is similar to the TIR lens array 200 in FIG. 1, and the main differences therebetween are as follows. In the TIR lens array 200*d*, the TIR lens 220*d* may have inclined surfaces 222*d* which is a freeform surface. For example, the cross-section A1 of the TIR lens 220*d* perpendicular to the optical axis B1 of the TIR lens 220*d* may be approximate to a square, the cross-section A3 of the TIR lens 220*d* perpendicular to the optical axis B1 of the TIR lens 220*d* may be approximate to a circle, and the cross-section A2 of the TIR lens 220*d* perpendicular to the optical axis B1 of the TIR lens 220*d* may be a shape between a square and a circle. The cross-sections of the TIR lens 220*d* perpendicular to the optical axis B1 may gradually vary along the optical axis B1. In other embodiments, the cross-sections A1, A2, and A3 may be three other different shapes. As a result, the illumination area provided by the light source module adopting the TIR lens array 200*d* may be a square, a rectangle, a circle, an ellipse, other geometric shapes, or other irregular shapes.

In the light source module according to the embodiment of the invention, TIR lenses are adopted, each of the TIR lenses has an inclined surface inclined with respect to the transparent substrate, and inclined surfaces of the TIR lenses are configured to totally internally reflect the light beams to form the wide FOV. In this way, the smaller the inclined angle of the inclined surface with respect to the transparent substrate is, the larger the FOV can be. Therefore, for achieving a large FOV, the inclined surface need not be steep but is gentle, so that the TIR lens is easy to fabricate for achieving a large FOV. As a result, the light source module according to the embodiment of the invention can achieve a wide FOV view and is easy for fabrication. In addition, in some embodiments of the invention, by adopting TIR lenses having a plurality of different inclined angles, or the inclined surface having a plurality of different slopes, or refractive lenses, the light source module can reach wide FOV and control the scattering light intensity distribution.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light source module having a wide field of view (FOV), the light source module comprising:

- a plurality of point light sources configured to respectively emit a plurality of light beams; and
- a total internal reflection (TIR) lens array disposed on paths of the light beams and comprising:
  - a transparent substrate, wherein the transparent substrate is a substrate of a bottom emitting vertical cavity surface emitting laser (VCSEL), and the point light sources belong to the bottom emitting VCSEL; and
  - a plurality of TIR lenses arranged on the transparent substrate, wherein the transparent substrate is located between the point light sources and the TIR lenses, each of the TIR lenses has an inclined surface inclined with respect to the transparent substrate, and inclined surfaces of the TIR lenses are configured to totally internally reflect the light beams to form the wide FOV.

2. The light source module according to claim 1, wherein each of the TIR lenses is a TIR cone.

3. The light source module according to claim 1, wherein a light beam from each of the point light sources is reflected by the inclined surface of one of the TIR lenses.

4. The light source module according to claim 1, wherein a light beam from each of the point light sources travels to several of the TIR lenses.

5. The light source module according to claim 1, wherein the TIR lenses have a plurality of different inclined angles of the inclined surface with respect to the transparent substrate.

6. The light source module according to claim 1, wherein the inclined surface of each of at least parts of the TIR lenses has a plurality of different slopes with respect to the transparent substrate.

7. The light source module according to claim 1, wherein inclined surfaces of at least parts of the TIR lenses are freeform surfaces.

8. The light source module according to claim 1, wherein the TIR lens array further comprises a plurality of refractive lenses arranged on the transparent substrate, and the transparent substrate is located between the point light sources and the refractive lenses.

9. The light source module according to claim 1, wherein the TIR lens array further comprises a plurality of refractive lenses arranged on the transparent substrate, and the refractive lenses are located between the point light sources and the transparent substrate.

10. The light source module according to claim 1, wherein the TIR lens array further comprises a plurality of collimating lenses arranged on the transparent substrate, and the collimating lenses are located between the point light sources and the transparent substrate.

11. The light source module according to claim 1, wherein the point light sources are a VCSEL, a VCSEL array, a photonic crystal surface emitting laser (PCSEL), or a PCSEL array.

12. The light source module according to claim 1, wherein the TIR lens array is in a regular arrangement or in a random arrangement.

* * * * *